(12) United States Patent
Higaki

(10) Patent No.: US 9,769,358 B2
(45) Date of Patent: Sep. 19, 2017

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yoshinari Higaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 33 days.

(21) Appl. No.: 14/708,015

(22) Filed: May 8, 2015

(65) Prior Publication Data

US 2015/0326781 A1   Nov. 12, 2015

(30) Foreign Application Priority Data

May 12, 2014   (JP) ................................. 2014-098989

(51) Int. Cl.
*H04N 5/217*   (2011.01)
*H04N 5/232*   (2006.01)
*H04N 5/235*   (2006.01)

(52) U.S. Cl.
CPC ............ *H04N 5/217* (2013.01); *H04N 5/235* (2013.01); *H04N 5/23212* (2013.01); *H04N 5/23229* (2013.01); *H04N 5/23235* (2013.01)

(58) Field of Classification Search
CPC ........... H04N 5/23235; H04N 5/23229; H04N 5/23212; H04N 5/235; H04N 5/217
See application file for complete search history.

(56) References Cited

U.S. PATENT DOCUMENTS

| | | | |
|---|---|---|---|
| 2009/0316014 A1* | 12/2009 | Lim ..................... | H04N 5/2254 348/222.1 |
| 2010/0141802 A1* | 6/2010 | Knight ............... | H04N 5/23212 348/240.3 |
| 2011/0129165 A1* | 6/2011 | Lim ................... | H04N 5/23212 382/255 |
| 2012/0057040 A1* | 3/2012 | Park ..................... | H04N 5/2254 348/222.1 |
| 2013/0128068 A1* | 5/2013 | Georgiev ........... | H04N 5/23229 348/222.1 |
| 2013/0128087 A1 | 5/2013 | Georgiev et al. | |

* cited by examiner

*Primary Examiner* — Luong T Nguyen
(74) *Attorney, Agent, or Firm* — Canon U.S.A. Inc., IP Division

(57) ABSTRACT

An information processing apparatus and an information processing method in which each piece of data included in light field data including a plurality of pieces of data indicating an incidence position, an incidence direction, and an intensity of a ray incident on an imaging apparatus from an object is projected based on a plurality of pieces of data corresponding to an object that is the same as the object corresponding to the data in a light field space defined by the incidence position and the incidence direction of the ray. Thus, light field data with an amount of information increased in a predetermined space in the light field space.

16 Claims, 14 Drawing Sheets

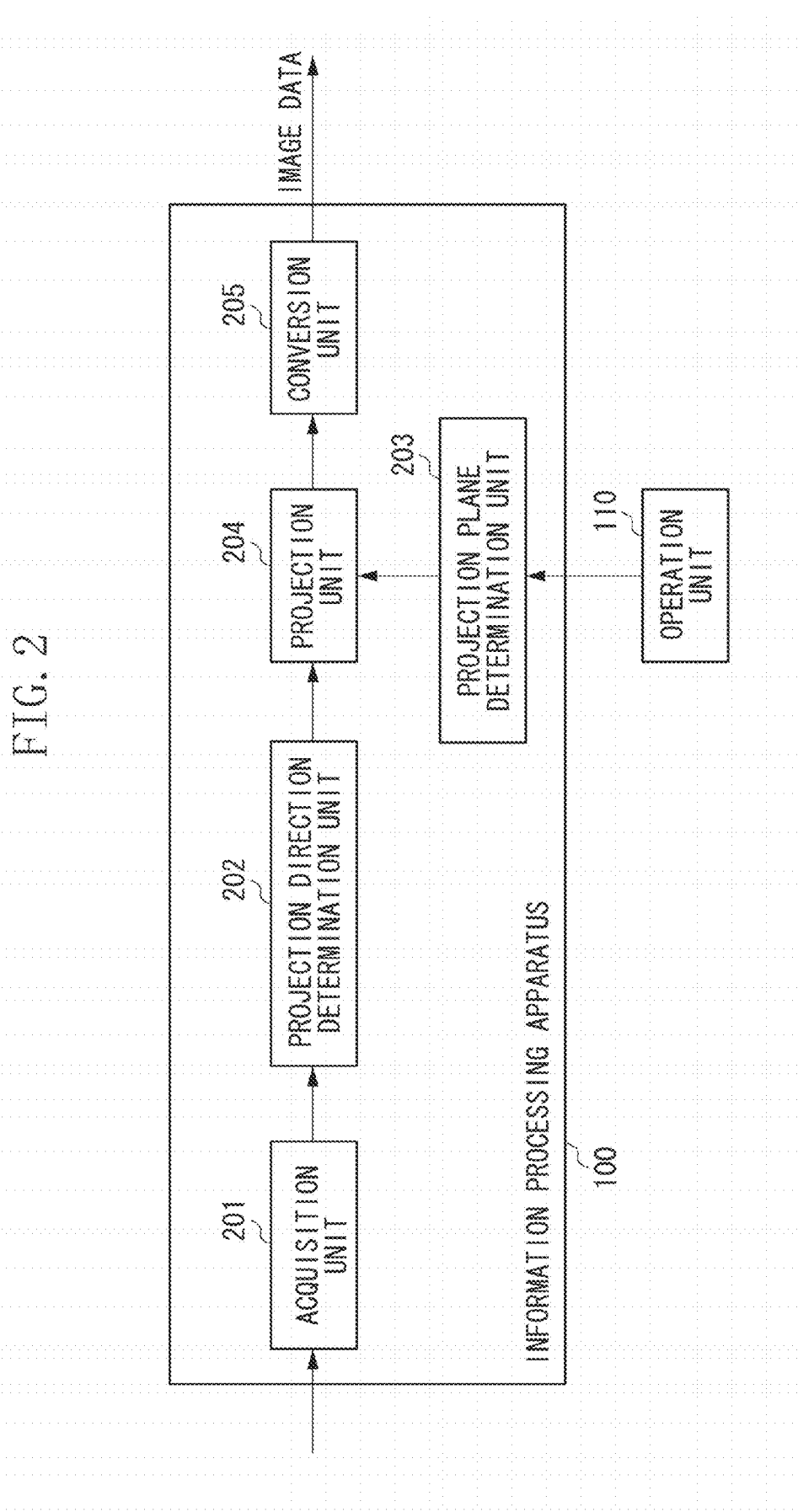

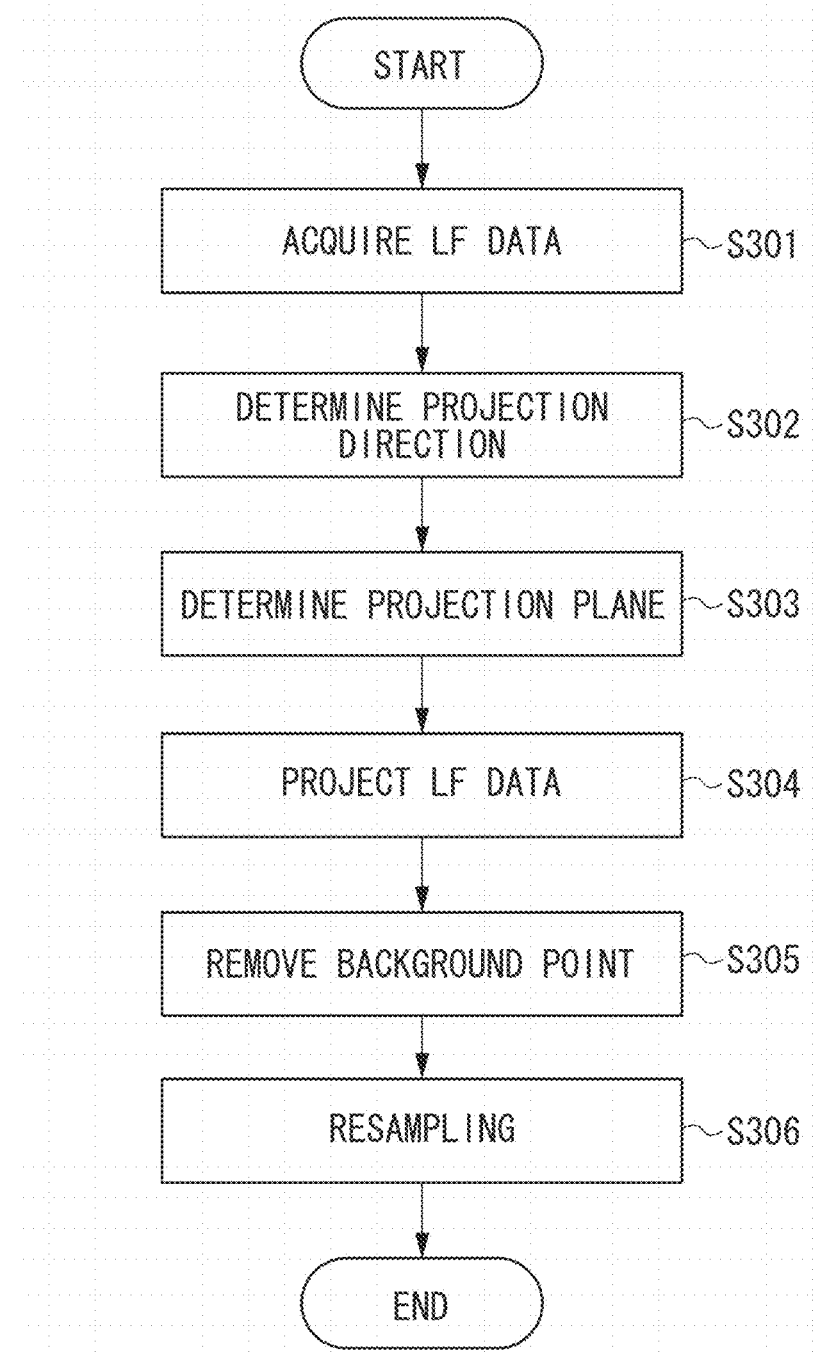

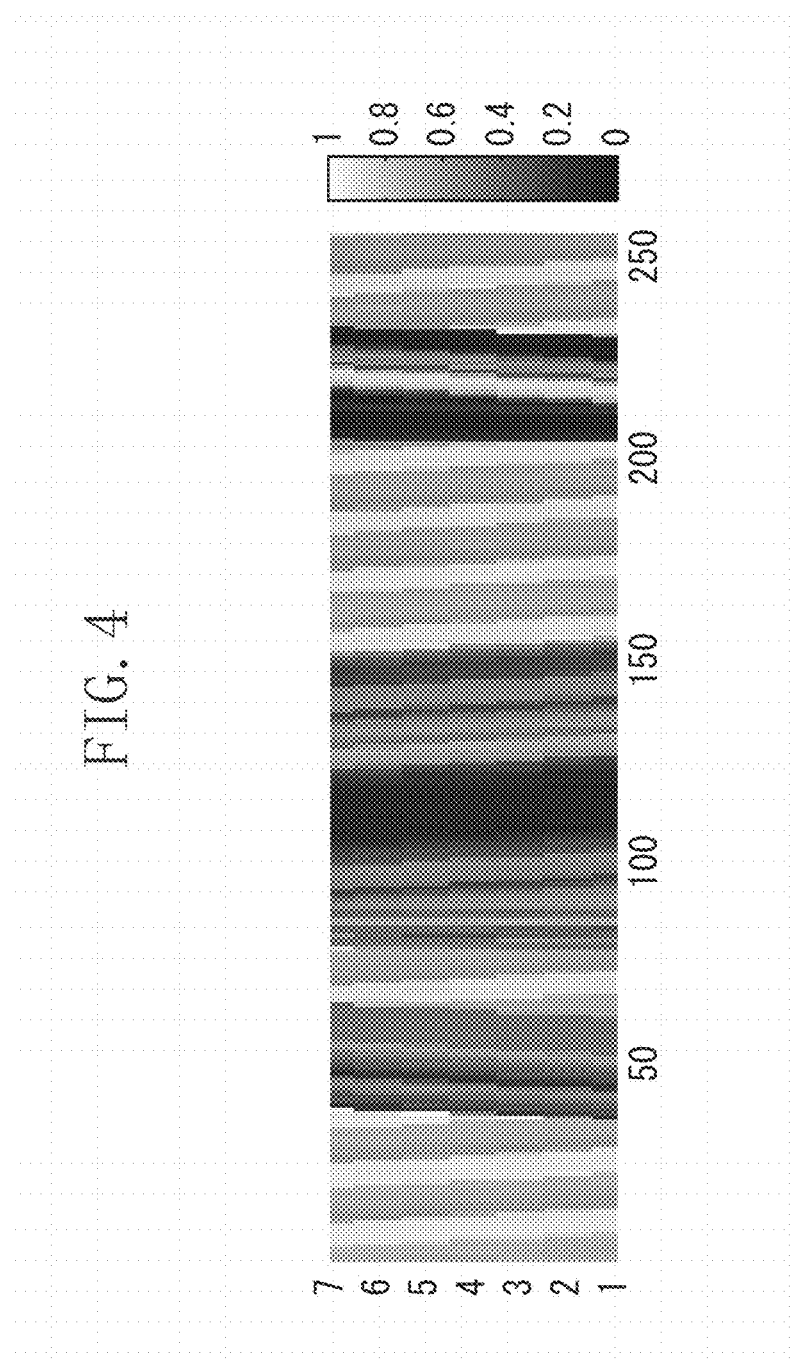

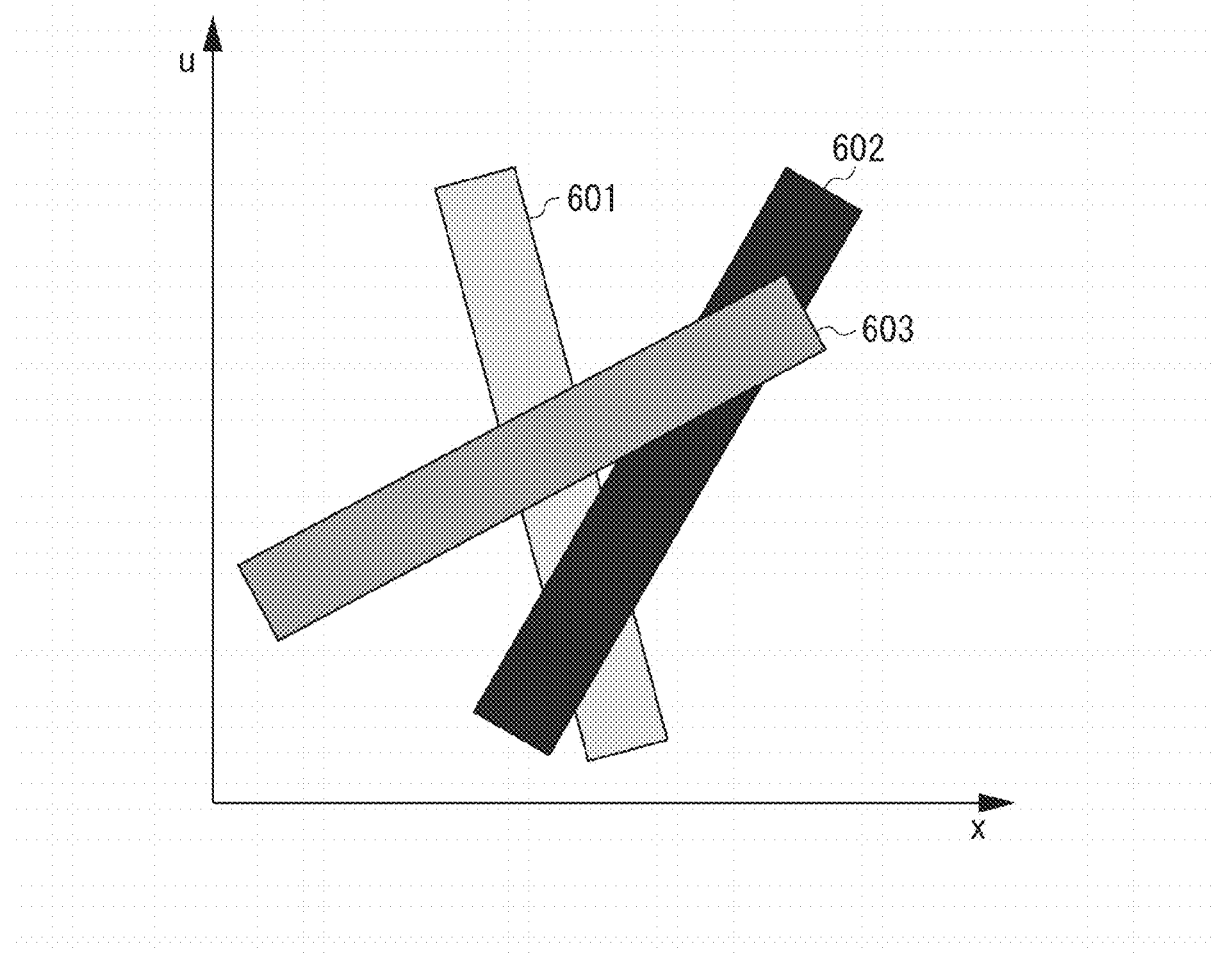

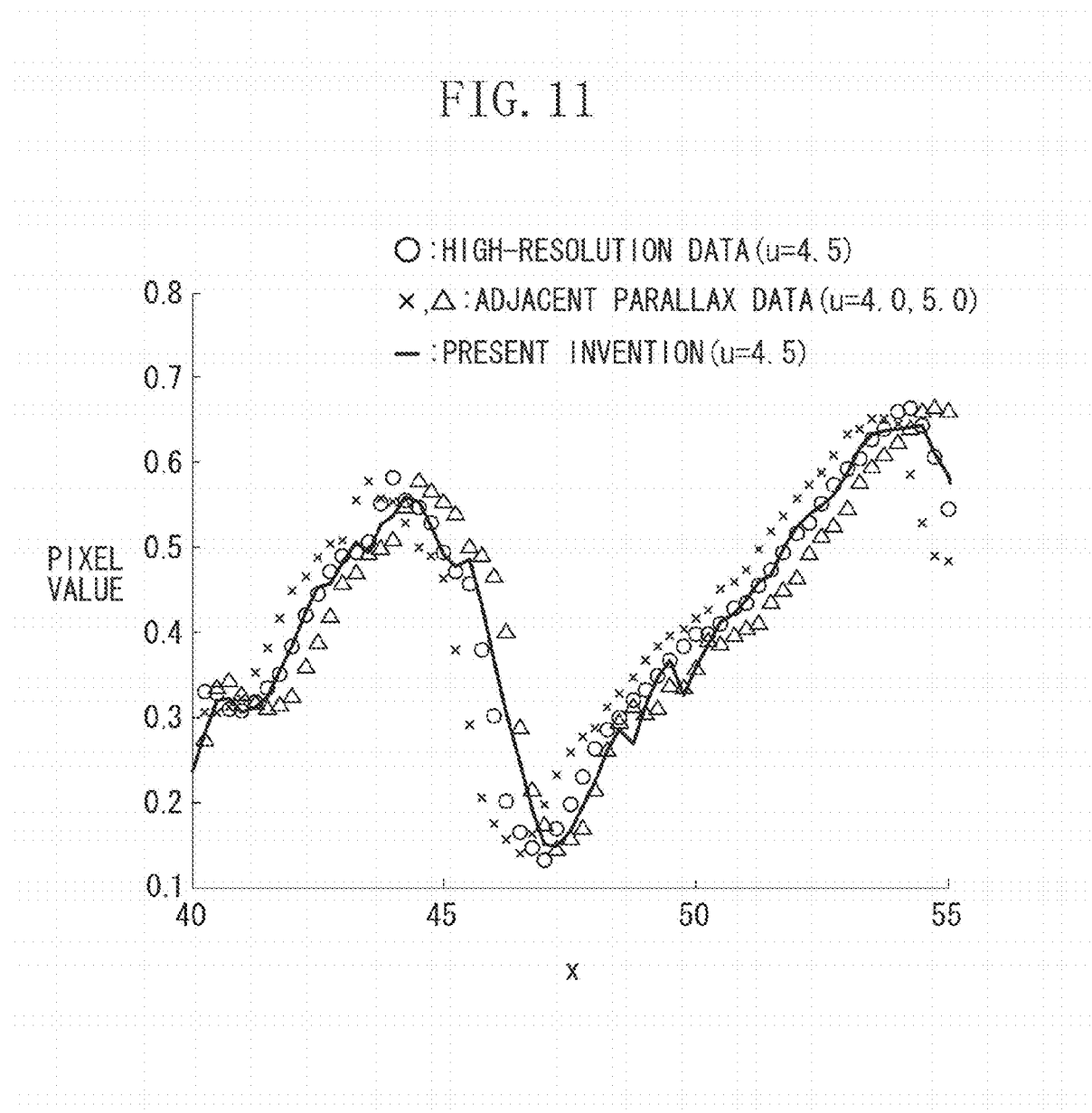

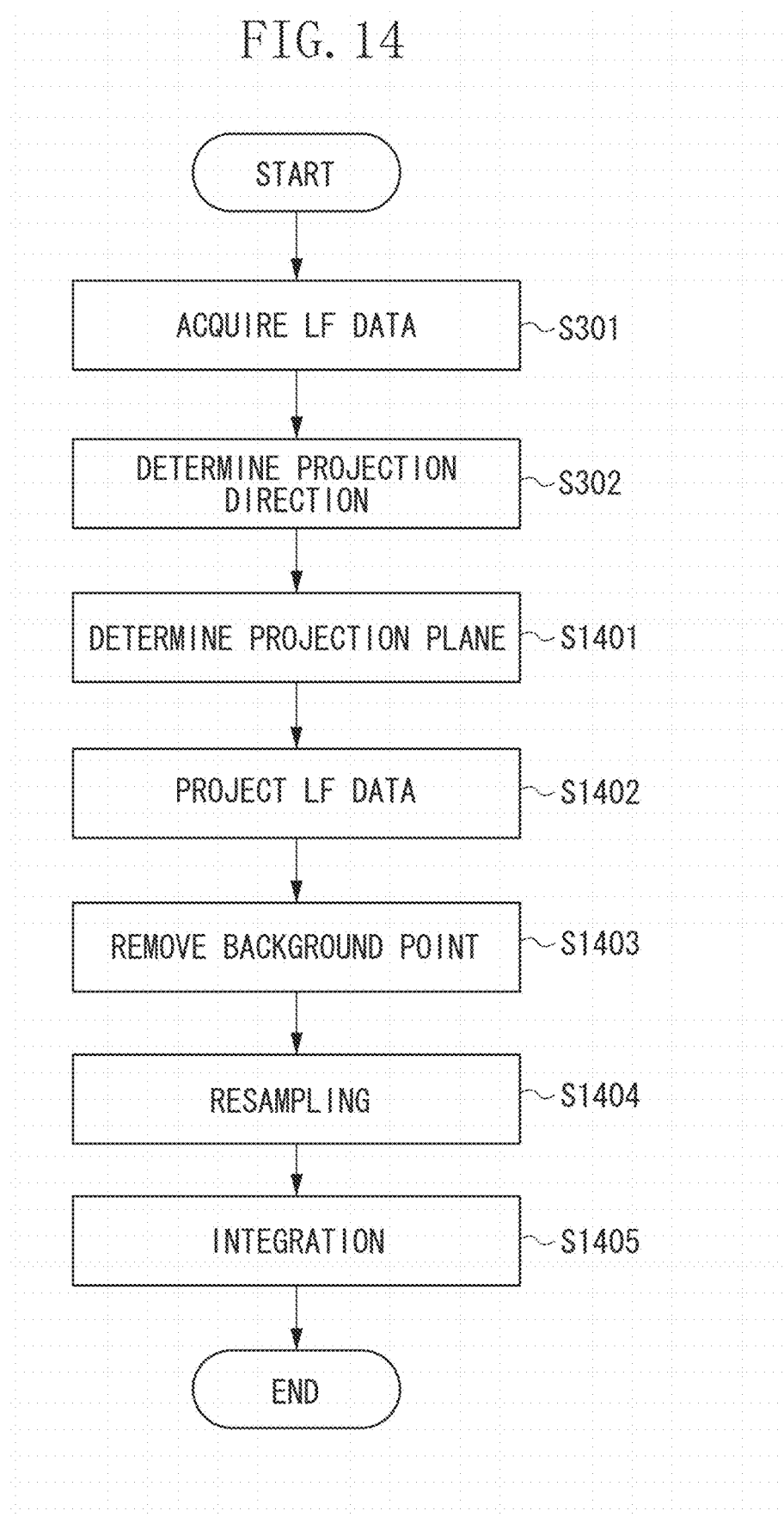

INFORMATION PROCESSING APPARATUS, INFORMATION PROCESSING METHOD, AND STORAGE MEDIUM

BACKGROUND OF THE INVENTION

Field of the Invention

The present invention relates to resolution enhancement on light field data including information about a direction and an intensity of a ray.

Description of the Related Art

A light field (light field is hereinafter referred to as LF) camera has been proposed. The LF camera is a camera that acquires information (LF data) about an incidence position, an incidence direction, and an intensity of a ray incident on the camera from an object. The LF camera includes an array camera in which a plurality of small cameras are arranged and a plenoptic camera in which a micro lens array, as a two dimensional array of a plurality of micro convex lenses, is disposed near an image sensor. With the LF camera, a plurality of images from different viewpoints (a group of parallax images) can be acquired at once. Disadvantageously, due to the mechanism, the resolution of each parallax image is generally lower than the resolution of an image acquired by a conventional camera with the same total number of pixels of the image sensor. Thus, a technique of enhancing resolution of the image that can be acquired by the LF camera has been required. US Patent Application Laid-Open No. 2013-0128087 discusses a technique of generating a high-resolution image by projecting LF data, corresponding to a point outside a plane corresponding to a single image, on the plane on an LF space defined by an incidence position and an incidence direction of a ray.

However, in the technique discussed in US patent application Laid-Open No. 2013-0128087, all pieces of the LF data are uniquely projected in the same direction. Thus, there is a problem in that a region in which resolution enhancement is achieved is limited to only a part of an image. This is because when the direction in which pieces of LF data corresponding to the same object are arranged in the LF space does not match the projection direction, an image of the object is spread by the projection and blurring occurs.

SUMMARY OF THE INVENTION

The present invention is directed to a technique capable of generating LF data in which resolution enhancement is achieved in a wider range than in a case where pieces of LF data are uniquely projected in the same direction.

An information processing apparatus according to an aspect of the present invention includes, an acquisition unit configured to acquire light field data including a plurality of pieces of data indicating an incidence position, an incidence direction, and an intensity of a ray incident on an imaging apparatus from an object, an derivation unit configured to obtain, for each piece of data included in the light field data, information indicating a projection method in a light field space defined by the incidence position and the incidence direction of the ray, based on a plurality of pieces of data corresponding to an object that is same as an object corresponding to the piece of data, and a correction unit configured to project data included in the light field data corresponding to a region that does not belong to a predetermined subspace in the light field space, on the subspace based on the projection method obtained by the derivation unit to generate corrected data in which an amount of information in the light field data is increased in the subspace.

Further features of the present invention will become apparent from the following description of exemplary embodiments with reference to the attached drawings.

BRIEF DESCRIPTION OF THE DRAWINGS

FIG. 2 is a block diagram illustrating a configuration of the information processing apparatus according to the first exemplary embodiment.

FIG. 3 is a flowchart illustrating a flow of processing executed in the information processing apparatus according to the first exemplary embodiment.

FIG. 4 is a diagram illustrating an example of two dimensional LF data.

FIG. 6 is a diagram illustrating a relationship between a position of an object and LF data.

FIG. 11 is a diagram illustrating an example of a result of resolution enhancement according to a second exemplary embodiment.

FIG. 14 is a flowchart illustrating a flow of processing executed in an information processing apparatus according to the third exemplary embodiment.

DESCRIPTION OF THE EMBODIMENTS

In a first exemplary embodiment, an example is described where image data in which a resolution enhancement is achieved in a wide range is generated by determining a projection direction individually for each of the objects corresponding to respective pieces of LF data, when the LF data is projected on an LF space. First of all, a configuration of an information processing apparatus according to the first exemplary embodiment is described.

Figure 1:
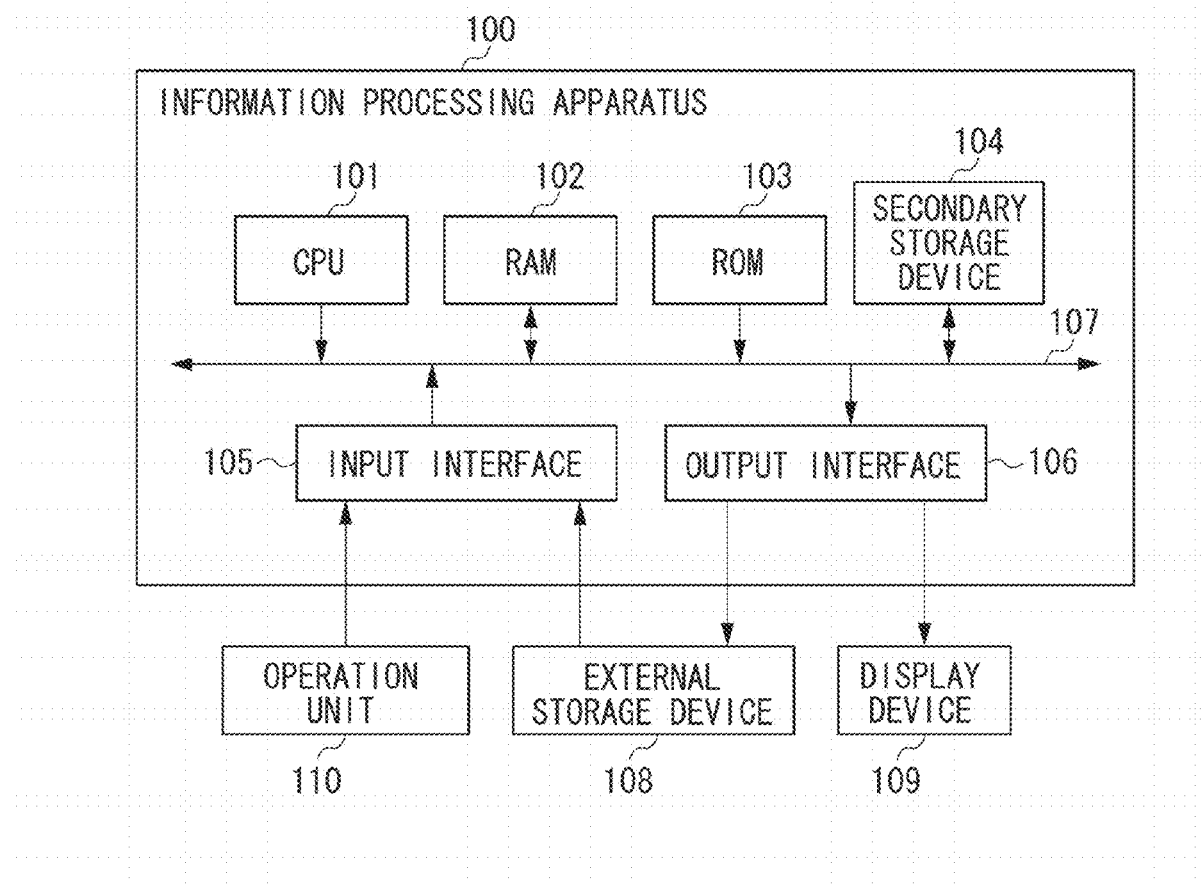
FIG. 1 is a block diagram illustrating a configuration of an information processing apparatus according to a first exemplary embodiment.

FIG. 1 is a diagram illustrating an example of the configuration of the information processing apparatus according to the first exemplary embodiment. The information processing apparatus 100 (hereinafter, referred to as a processing apparatus 100) according to the first exemplary embodiment includes a central processing unit (CPU) 101, a random access memory (RAM) 102, a read only memory (ROM) 103, a secondary storage device 104, an input interface 105, and an output interface 106. The components of the processing apparatus 100 are connected to each other through a system bus 107. The processing apparatus 100 is connected to an external storage device 108 and an operation unit 110 through the input interface 105. The processing apparatus 100 is connected to the external storage device 108 and a display device 109 through the output interface 106.

The CPU 101 is a processor that executes a program stored in the ROM 103 by using the RAM 102 as a work memory, and performs overall control on the components of the processing apparatus 100 through the system bus 107 so that various types of processing described below are executed. The secondary storage device 104 is a storage device that stores various types of data processed in the processing apparatus 100, and is a hard disk drive (HDD) in the present exemplary embodiment. The CPU 101 can write and read data to and from the secondary storage device 104 through the system bus 107. Various storage devices other than the HDD, such as an optical disc drive and a flash memory, may be used for the secondary storage device 104.

The input interface 105 is a serial bus interface such as a universal serial bus (USB) or an Institute of Electrical and Electronics Engineers (IEEE) 1394 bus, for example. An external apparatus inputs data, a command, and the like to the processing apparatus 100 through the input interface 105. The processing apparatus 100 acquires data from the external storage device 108 (a storage medium such as a hard disk, a memory card, a compact flash (CF) card, an secure digital (SD) card, and a USB memory for example) through the input interface 105. The processing apparatus 100 acquires a command from a user, input by using the operation unit 110, through the input interface 105. The operation unit 110 is an input device such as a mouse or a keyboard, and is used by the user for inputting an instruction to the processing apparatus 100.

The output interface 106 includes a serial bus interface such as a USB or an IEEE1394 bus, as in the case of the input interface 105. Alternatively, for example, a video output terminal such as a digital visual interface (DVI) or a high-definition multimedia interface (HDMI) (registered trademark) may be used for the output interface 106. The processing apparatus 100 outputs data to the external devices through the output interface 106. The processing apparatus 100 outputs a processed image and the like to the display device 109 (various display devices such as a liquid crystal display) through the output interface 106, to display the image. The processing apparatus 100 further includes components other than those described above. Such components are unrelated to the main feature of the present invention and thus are not described.

Processing executed in the processing apparatus 100 according to the first exemplary embodiment is described below with reference to a functional block diagram in FIG. 2 and a flowchart in FIG. 3. The processing apparatus 100 according to the first exemplary embodiment has functions of an acquisition unit 201, a projection direction determination unit 202 (hereinafter, referred to as a direction determination unit 202), a projection plane determination unit 203 (herein after, referred to as a plane determination unit 203), a projection unit 204, and a conversion unit 205 as illustrated in FIG. 2. In the processing apparatus 100, the CPU 101 reads and executes a control program stored in the ROM 103, whereby the functions of the components described above are implemented. The processing apparatus 100 may include dedicated processing circuits corresponding to the components. A flow of processing executed by the components is described below.

In step S301, the acquisition unit 201 acquires LF data as a processing target through the input interface 105 or from the secondary storage device 104. The acquisition unit 201 outputs the acquired LF data to the direction determination unit 202. The LF data is data indicating information about an incidence position, an incidence direction, and an intensity of a ray incident on a camera from an object. Generally, the LF data is represented by spatial coordinates (x, y) of a point at which the ray is incident on an image sensing surface, direction coordinates (u, v) or (θ, φ) representing a direction of the ray, and an intensity value L. Here, (u, v) is the spatial coordinates of a point at which the ray passes through a uv plane that is parallel to an xy plane and is separated from the xy plane by a predetermined distance, and (θ, φ) is a value indicating an angle of the ray incident on the point (x, y). How the LF data is represented is not limited to what is described above. The LF data may be represented in any way as long as parameters defining the incidence position, the incidence direction, and the intensity of the ray are involved. For example, instead of using the intensity at a point in the four dimensional space described above, the LF data may be represented by using a more generalized seven dimensional space. The seven dimensional space data is generally known as a plenoptic function, and includes three dimensional spatial coordinates, two dimensional direction coordinates, time, and a wavelength.

The LF data used in the first exemplary embodiment, which is of a four dimensional value represented as L(x, y, u, v), is described based on a two dimensional cross section unless otherwise specified, to simplify the description below. The two dimensional cross section is expressed by one dimensional spatial coordinate and one dimensional direction coordinate. Such an LF cross section, which is generally referred to as an Epipolar-plane image, is hereinafter referred to as two dimensional LF data. The characteristics of the two dimensional LF data and processing corresponding to those characteristics described below, can be directly applied to the original four dimensional LF data. The LF data, represented in a way not described above, may be generated and acquired from a group of parallax images acquired by an array camera or a plenoptic camera, for example. Here, (x, y) and (u, v) described above respectively correspond to a pixel position of each parallax image and a viewpoint position of each parallax image, and thus can be converted into the LF data L(x, y, u, v) of a four dimensional value, by assigning coordinates based on the corresponding relationship to pixel values of pixels in the group of parallax images.

FIG. 4 illustrates an example of actual LF data of a 7×256 size. In the figure, the horizontal axis represents a spatial coordinate x, a vertical axis represents a direction coordinate u, and a gradation of each piece of data represents the intensity value L. It has been known that data points corresponding to the same object forms a line in an LF space defined by the spatial coordinate and the direction coordinate of the ray as illustrated in FIG. 4. In the first exemplary embodiment, the line formed by a group of pieces of data corresponding to the same object is referred to as an LF line element. Generally, the LF data is formed as a group of the LF line elements. The inclination of the LF line element varies in accordance with a distance from a camera that acquires the LF data to each object. Thus, general LF data includes a plurality of LF line elements inclined differently. More specifically, the general LF data includes a plurality of LF line elements extending in different directions. In this example, the same object is, in particular, the same single point in an real space corresponding to a single pixel in an image. Alternatively, the LF line elements may be detected with a small area in the real space corresponding to a plurality of pixels being regarded as the same object.

Figure 5A:
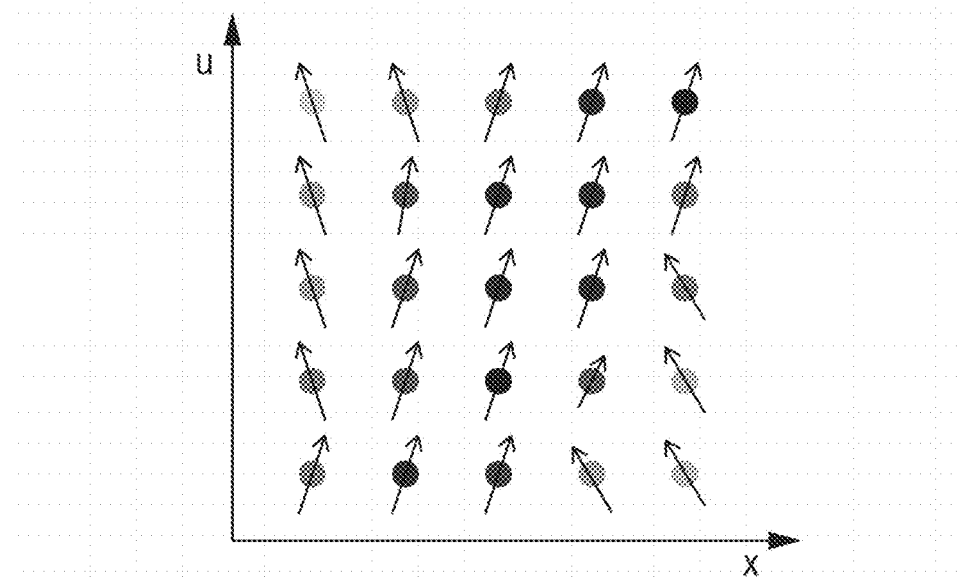
FIGS. 5A and 5B are diagrams illustrating an overview of resolution enhancement according to the first exemplary embodiment.
Figure 5B:
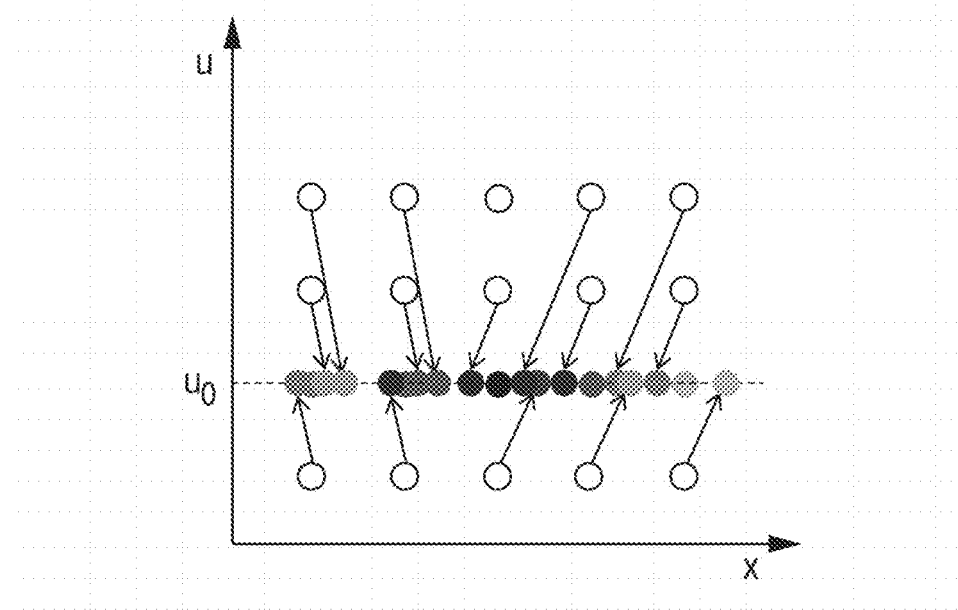

In step S302, the direction determination unit 202 obtains the directions of the LF line elements included in the LF data input from the acquisition unit 201, and determines the projection direction of each data point. FIG. 5A illustrates an overview of the LF data acquired by an LF camera. In FIG. 5A, each point represents a data point of the LF data acquired by the LF camera, and an arrow provided to each data point represents a direction of the corresponding line element. As illustrated in FIG. 5A, the LF data acquired by an LF camera takes a discrete value due to a physical constraint such as a dispersed arrangement of image sensors. However, when a subspace such as a plane is designated in the LF space, an amount of information in the subspace can be increased by projecting data points outside the subspace on the subspace. In the first exemplary embodiment, as illustrated in FIG. 5B, a plane with a fixed direction coordinate is designated in the LF space, and data points outside the plane are projected on the plane. Thus, information between dispersed pieces of actually acquired data is interpolated, whereby high resolution image data is output. In the example in FIG. 5B, description is given by using two dimensional LF data, and thus a straight line $u=u_0$ parallel to the x axis is the projection target. However, in the actual image processing, the projection target is a plane parallel to an xy plane with fixed u and v. Preferably, at that time, a projection direction of each data point matches the direction of the LF line element corresponding to the data point. This is because when the data point is projected in a direction other than the direction of the corresponding LF line element, the resultant projection destination interferes with the projection destination of a data point corresponding to a different object, and blurring occurs in the resultant image data. Therefore, in step S302, the direction of each LF line element in the LF data input from the acquisition unit 201 is obtained, and the acquired direction is set as the projection direction of the data point. The projection direction may not exactly match the direction of the LF line element. The projection direction may be slightly offset from the direction of the LF line element, as long as the projection direction is based on the direction of the LF line element.

Various methods for obtaining a straight line may be employed for obtaining the direction of the LF line element. For example, a method of calculating the direction of the LF line element, i.e., the projection direction through a differential operation on the LF data in the LF space may be employed. A difference between adjacent pixels, a central difference, a Sobel filter, and the like, may be used for the differential operation. As a result of the differential operation, a gradient vector indicating a direction involving the most acute change in the intensity value of the LF data is derived, and the direction orthogonal to the gradient vector is estimated as the direction of the LF line element. In other words, the direction determination unit 202 obtains the vector orthogonal to the gradient vector obtained through the differential operation as the projection direction vector indicating the projection direction of each data point. The projection direction vector may be individually obtained for each data point. Alternatively, a plurality of data points corresponding to the same LF line element may be grouped, and the same projection direction vector may be uniquely allocated to the plurality of data points thus grouped. The projection direction may be obtained by an image processing method such as Hough transform instead of the differential operation. The direction determination unit 202 outputs the projection direction vector corresponding to each data point determined through the processing described above to the projection unit 204.

In step S303, the plane determination unit 203 determines the position of the projection plane on which each data point is projected, based on an operation on the operation unit 110 by the user. As described above, (x, y) corresponds to the pixel position in the parallax image and (u, v) corresponds to the viewpoint position of the parallax image in the four dimensional LF data. Thus, the user operates the operation unit 110 to designate the viewpoint position corresponding to the high resolution image that the user wants to generate. Thus, the value of (u, v) is fixed, and the plane determination unit 203 determines the xy plane corresponding to the fixed (u, v) value as the projection plane, and outputs the fixed (u, v) value to the projection unit 204. The viewpoint position of the generated image needs not to be set by the user, and may be automatically determined by the processing apparatus 100 in accordance with a scene.

In step S304, the projection unit 204 projects each data point based on the projection direction and the projection plane determined in steps S302 and S303. In other words, intersecting coordinates between LF line elements and the projection plane are obtained. Alternatively, the direction determination unit 202 may derive the intersecting coordinates. When one dimensional high resolution data is output based on the two dimensional LF data, a spatial coordinate x of data projected on the projection target can be expressed as in the following Formula 1:

$$x = x' + \frac{P_x}{P_u}(u - u'). \quad (1)$$

In Formula 1, x' and u' represent LF coordinates of a data point to be projected, x and u represent LF coordinates of the projected data point, and $P_x$ and $P_u$ respectively represent x axis direction and u axis direction components of the projection direction vector. When a two dimensional high resolution image is output based on three dimensional LF data, a y coordinate (second spatial coordinate) is further calculated with the following Formula 2:

$$y = y' + \frac{P_y}{P_u}(u - u'). \quad (2)$$

In this case, the direction determination unit 202 needs to calculate a three dimensional projection direction vector (Px, Py, Pu) for each data point, in step S303. A specific example of a method of determining the projection direction through the differential operation in such a case is described below. A two dimensional gradient vector (Gx, Gu) of each sampling point in each x-u cross section of the three dimensional LF data is calculated through the differential operation, and similarly, a gradient vector (Gy, Gu') in each y-u cross section is calculated. The projection direction vector at each sampling point should be orthogonal to these two gradient vectors at the same point, and thus the three dimensional projection direction vector can be obtained by obtaining an outer product of the vectors in the following Formula 3:

$$\begin{pmatrix} P_x \\ P_y \\ P_u \end{pmatrix} = \begin{pmatrix} G_x \\ 0 \\ G_u \end{pmatrix} \times \begin{pmatrix} 0 \\ G_y \\ G'_u \end{pmatrix} = \begin{pmatrix} -G_u G_y \\ -G_x G'_u \\ G_x G_y \end{pmatrix}. \quad (3)$$

The projection direction vector may have any length, and thus all the components in Formula 3 may be multiplied by a constant. When a two dimensional high resolution image is output based on four dimensional LF data, the x coordinate after the projection is calculated by using the following Formula 4 with a v axis being defined as a second ray direction coordinate:

$$x = x' + \frac{P_x}{P_u}(u - u') + \frac{P_x}{P_v}(v - v'). \quad (4)$$

Similarly, the y coordinate is calculated by using Formula 5:

$$y = y' + \frac{P_y}{P_u}(u - u') + \frac{P_y}{P_v}(v - v'). \quad (5)$$

In this case, the direction determination unit 202 needs to calculate the four dimensional projection direction vector (Px, Py, Pu, Pv) for each sampling point. The two dimensional plane as the projection target satisfies a constraint condition of having u and v as values of the same u and v coordinates. A specific example of a method of determining the projection direction through the differential operation is described below. In this example, two dimensional gradient vectors (Gx, Gu), (Gy, Gu'), (Gx', Gv), and (Gy', Gv') of each sampling point for all the two dimensional cross sections including the u or v axis are calculated trough the differential operation, as in the case of the three dimensional LF. Then, a four dimensional vector (Px, Py, Pu, Pv) orthogonal to all the vectors is calculated by solving Formula 6, with a general algebraic solution such as Gaussian elimination, for (Px, Py, Pu, Pv):

$$\begin{pmatrix} G_x & 0 & G_u & 0 \\ 0 & G_y & G'_u & 0 \\ G'_x & 0 & 0 & G_v \\ 0 & G'_y & 0 & G'_v \end{pmatrix} \begin{pmatrix} P_x \\ P_y \\ P_u \\ P_v \end{pmatrix} = 0. \quad (6)$$

When the LF data includes a plurality of color channels, the processing described above may be executed on each color channel, or projection directions of all the color channels may be determined from the LF data including a single channel to prevent color misregistration. The channel used for determining the projection directions may be one of the plurality of color channels of the LF data, or may be another channel such as brightness information obtained by converting color information.

In step S305, the projection unit 204 removes a data point corresponding to a background object hidden behind a foreground object in the LF data after the projection. In the projection processing in step S304, the occlusion due to the foreground-background relationship among a plurality of objects in a scene is not taken into consideration. Thus, the data point, corresponding to the object that is hidden by the foreground object and thus is not supposed to be visible, is also projected on the projection plane. Therefore, in step S305, the processing is executed for removing the data point, corresponding to the background object that is hidden by the foreground object and thus is not supposed to be visible, from the data points that have been projected on the projection plane. In the processing, prior information, indicating that the direction of the LF line element configuring the LF data corresponds to a distance between a point on an object that has emitted the corresponding ray and a camera that has acquired the LF data, is used. The corresponding relationship between the direction of the LF line element and the distance from the camera varies depending on how the u axis is defined in the LF space. For example, in the first exemplary embodiment, the LF line element corresponding to an object closer to the camera is more inclined in a positive x axis direction with respect to the u axis.

FIG. 6 is a diagram illustrating a foreground background relationship among LF line elements on the LF space. LF line elements 601 to 603 correspond to different objects and are inclined in different directions. Of the objects corresponding to the LF line elements, the object corresponding to the LF line element 601 is positioned farthest from the camera, the object corresponding to the LF line element 603 is positioned closest to the camera, and the object corresponding to the LF line element 602 is positioned between the two objects. As can be seen in the figure, one of the LF line elements corresponding to an object closer to the camera is more inclined in the positive x axis direction with respect to the u axis. At a portion where the LF line elements intersect, the LF line element corresponding to the object farther from the camera is hidden by the LF line element corresponding to the object closer to the camera, and thus is invisible. As described above, the positional relationship among the objects is related to the directions of the LF line elements and occlusion relationship among the LF line elements.

In step S305, the projection unit 204 uses the characteristics described above. More specifically, the projection unit 204 distinguishes between the data points corresponding to the foreground objects and the data points corresponding to the background objects based on the inclinations of the LF line element corresponding to the data points projected on the projection plane, and the projection unit 204 removes the data points corresponding to the background objects. More specifically, when a plurality of data points is projected on a region smaller than a predetermined threshold in the projection plane, data points other than the data point corresponding to the LF line element most inclined in the positive x axis direction with respect to the u axis, are all removed. Thus, information about a background object, which is hidden by a foreground object and thus is supposed to be invisible, is less likely to mix into the data on the projection plane. Accordingly, high resolution data closer to the actual view can be obtained. The size of the region used for the determination for removing data points may be set in accordance with the desired output resolution. For example, to improve the resolution of the output image by four times (2×2), the determination described above may be made when a plurality of data points is projected on a region of 0.5 pixels×0.5 pixels. The projection unit 204 outputs the LF data on the projection plane, from which the data points corresponding to the background object have been removed through the processing described above, to the conversion unit 205. In the present exemplary embodiment, the data points corresponding to the background object do not necessarily have to be removed, and may be provided with a smaller weight than the data points corresponding to the foreground object.

In step S306, the conversion unit 205 executes resampling on the LF data on the projection plane output from the projection unit 204, converts the data into image data, and outputs the image data to the system bus 107. The resampling is required for the conversion to obtain the image data because the data points in the LF data output from the projection unit 204 are not arranged at an equal interval. The resampling is the processing of estimating values at sampling positions at an equal interval different from the original sampling positions, based on processed data. For example, a known method, such as kernel regression, Delaunay-spline smoother, or nonuniform rational B-spline, may be used for the resampling. Through the resampling processing, the conversion unit 205 can generate image data with half the sampling interval and 4 (2×2) times higher resolution than that of the original LF data, for example. The conversion unit 205 may output the two dimensional data generated by the resampling as the high resolution image data without performing any processing thereon. Alternatively, the conversion unit 205 may execute development processing such as white balance adjustment, tone correction, noise removal, and compression on the generated data in accordance with an instruction from the user or settings accumulated in the secondary storage device 104 and the like, and then output the data.

The processing described above is executed in the processing apparatus 100 according to the first exemplary embodiment. Through the processing described above, the data points in the LF data can be projected in appropriate directions, whereby the image in which a high resolution is achieved in a large range can be generated from the LF data. The image generated through the method described above corresponds to resolution enhancement on an image corresponding to a single viewpoint in a group of parallax images acquired by the LF camera. Openings of apertures corresponding to the group of respective parallax images, acquired by the LF camera, are small in many cases. Thus, the high resolution image data thus obtained is generally a deep focus image in which the resolution enhancement is achieved in a wide range in the image.

Figure 7:
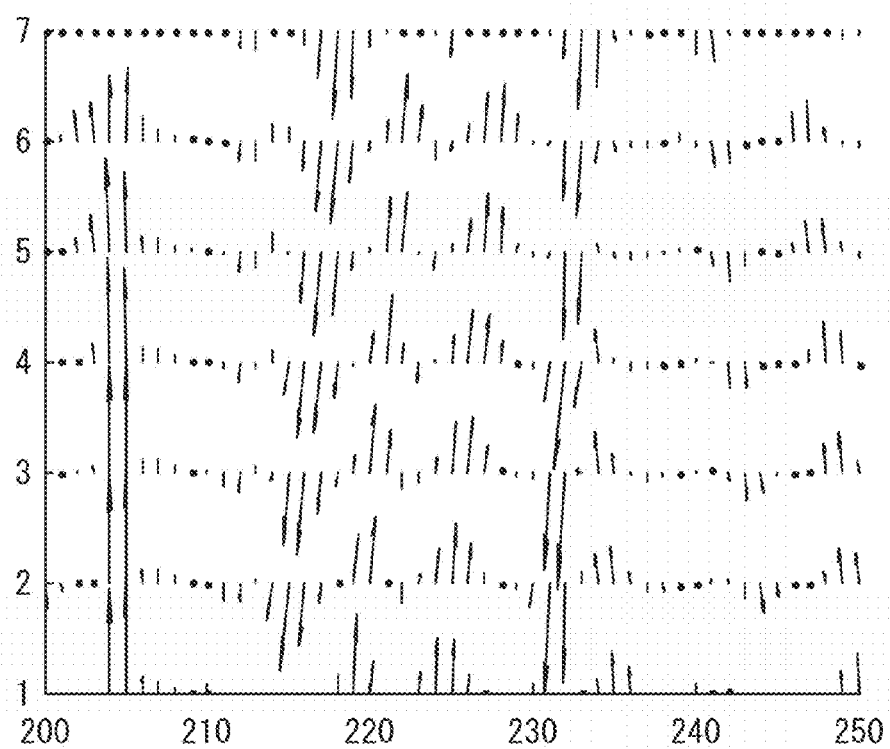
FIG. 7 is a diagram illustrating an example of how a projection direction vector is derived.

An example where the processing described above is actually executed on the LF data is described below, to describe the effects of the present exemplary embodiment. In this example, LF data with a size of 7×256 is used. This data is obtained by downsampling only the spatial coordinates of LF data with a size of 7×1024 to be reduced by ¼. The 7×1024 LF data is obtained by stacking monochrome actual images acquired from seven viewpoints of camera moved in a horizontal direction at an equal interval and obtaining the cross section. The resolution enhancement is executed on the 7×256 LF data obtained by the downsampling. Thus, a one dimensional image cross section of a resolution of 1024 is generated and is compared with the original data. The 7×256 LF data used in this example is the data that has been described with reference to FIG. 4. The LF data is discrete data in which the data points exist only at integer value coordinates defined with the u axis and the x axis. In this example, the projection direction vector is obtained through the differential operation using 3×3 Sobel filter in step S302. The size of the Sobel filter is not limited to this. FIG. 7 is a diagram illustrating the projection direction vector actually obtained for each data point in the LF data. In FIG. 7, a region corresponding to coordinates 200 to 250 in the x axis in FIG. 4 is enlarged for visibility. The length of each projection direction vector indicates the magnitude of the gradient of the gradient vector, and the region where the intensity value sharply changes is illustrated. The length of the projection direction vector may be set to be the same as long as the projection direction can be defined.

In this example, the straight line u=3.0 is the projection target of the data points. The LF data projected on the straight line is a one dimensional image corresponding to a single viewpoint. The data points projected based on the projection direction vectors obtained by the Sobel filter are resampled through interpolation based on Delaunay triangulation. Preprocessing such as outlier removal may be executed on the one dimensional unequal interval data generated by projecting the data points. The outlier removal is executed by using equal interval data (data actually acquired by the LF camera) that has been present before the projection, which is different from the data interpolated by the projection, on the straight line as the projection target. The conversion unit 205 executes resampling on the equal interval data that has been present before the projection through the method described above, to estimate data of the position of the interpolated data generated by the projection on the straight line as the projection target. Then, the conversion unit 205 compares the intensity value of the estimated data based on the equal interval data that has been present before the projection with the intensity value of the interpolated data generated by the projection, and removes the projection data with the intensity value largely different from the estimated data. In this example, the projection data, with the intensity value not within the range of the ±50% of the intensity value of the estimated data, is removed. How the outlier is determined is not limited to this, and, for example, the difference from the reference intensity value may be set with an absolute value instead of a relative value.

Figure 8A:
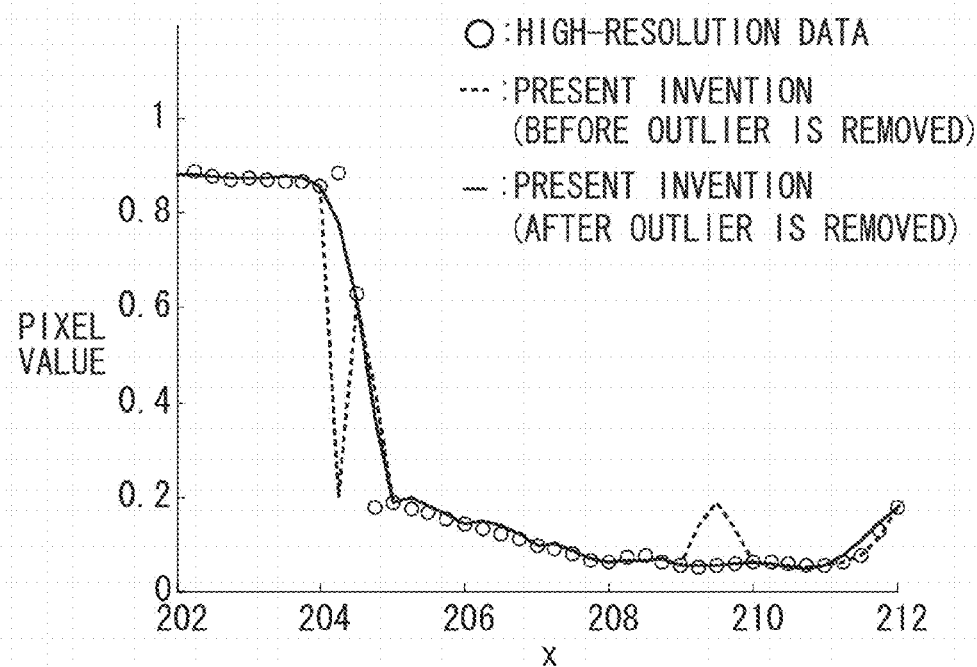
FIGS. 8A and 8B are diagrams illustrating an example of a result of the resolution enhancement according to the first exemplary embodiment.
Figure 8B:
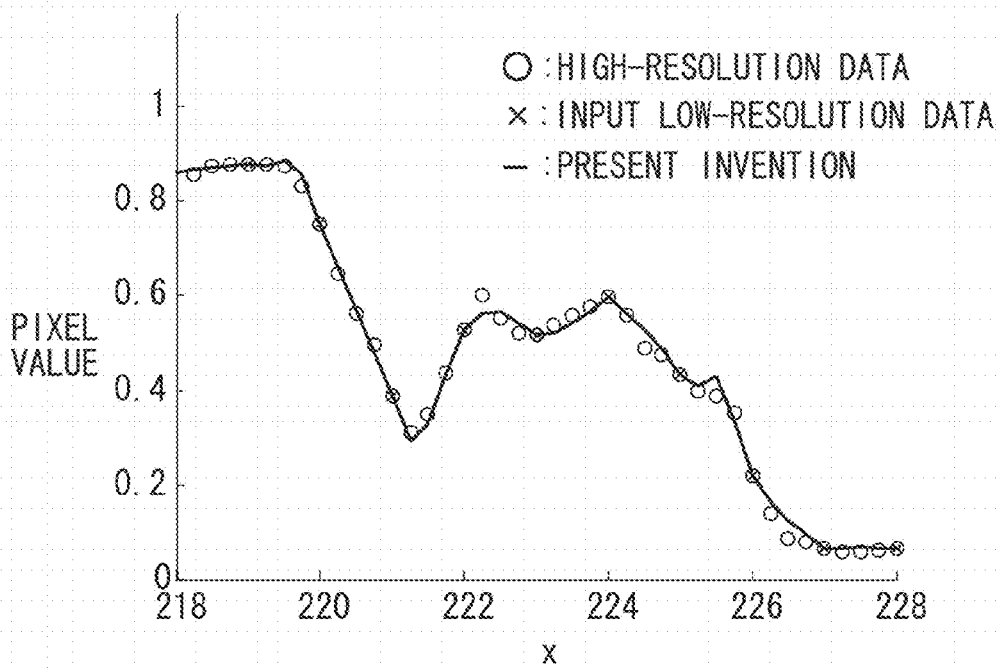

FIG. 8A illustrates a comparison between one dimensional data after the resampling when the outlier removal is executed, and one dimensional data after the resampling when the outlier removal is not executed. FIG. 8A is an enlarged view of a region corresponding to coordinates 202 to 212 on the x axis in FIG. 4. In FIG. 8A, "○" represents data on u=3.0 with the resolution of 1024 before the downsampling, a dotted line represents data that has been subjected to the resolution enhancement described above and not subjected to the outlier removal, and a solid line represents data that has been subjected to both the resolution enhancement and the outlier removal described above. It can be seen that a value closer to the original high resolution data can be obtained by executing the outlier removal. FIG. 8B illustrates the data that has been subjected to both the resolution enhancement and the outlier removal as viewed in a different range (coordinates 218 to 228 on the x axis). In FIG. 8B, "○" represents data on u=3.0 with the resolution of 1024 before the downsampling, and "×" represents data on u=3.0 with the resolution of 256 obtained by the downsampling. A solid line represents data that has been subjected to both the resolution enhancement and the outlier removal described above. As illustrated in FIG. 8A and FIG. 8B, with the method according to the present exemplary embodiment, a value close to the original high resolution data can be obtained in detail even at an extremum.

A two dimensional image can be output by similarly applying the method described above to LF data of three or more dimensions. In this case, the projection target is switched from the straight line parallel to the x axis to a plane parallel to the xy plane. The same applies to other exemplary embodiments described below.

Figure 9A:
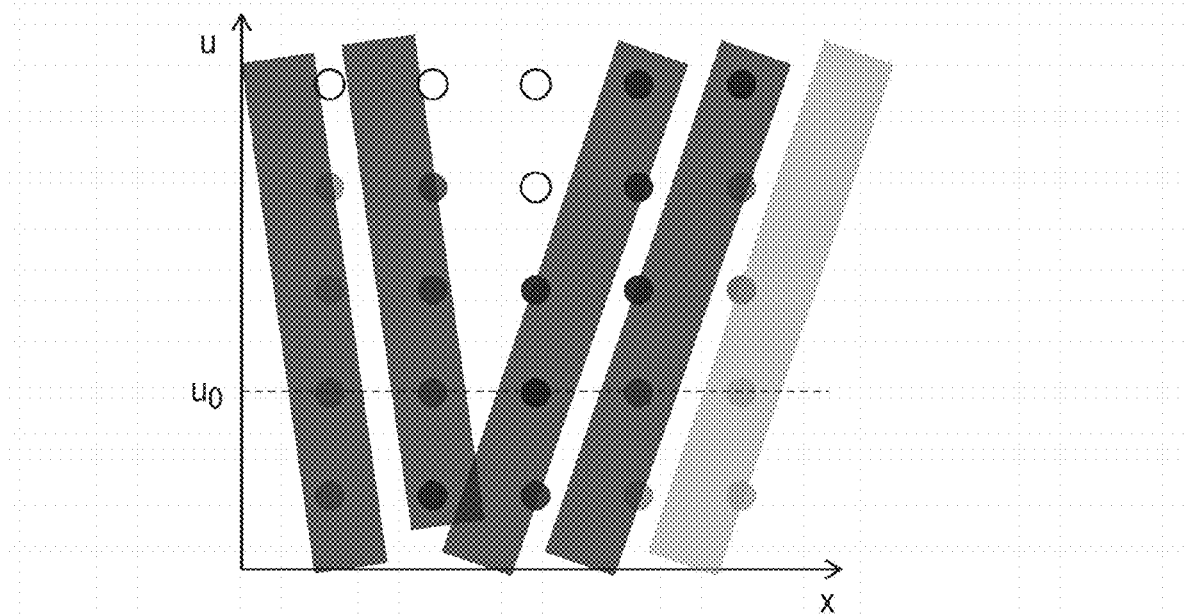
FIGS. 9A and 9B are diagrams illustrating an example of a determination method for determining projection data.
Figure 9B:

In the present exemplary embodiment described above, the example is described where the data points in the LF data are projected on the projection plane, and then the data points corresponding to the background that is supposed to be hidden behind the foreground are removed. Alternatively, the data points corresponding to the background may be excluded from the data points to be projected, in advance. The following method is an example of the method of excluding the data points corresponding to the background from the data points to be projected, in advance. In this method, only the data points adjacent to a group of LF lines passing through the straight line or the plane as the projection target remain as the data points to be projected. FIG. 9A is a diagram illustrating an overview of this method. In FIG. 9A, a gray strip is a region obtained by isotropic expansion of a LF line element that passes through the data points that have originally been present on the straight line $u=u_0$ as the projection target. Data points out of the regions are illustrated as white points. The white points represent data points corresponding to the rays emitted from the subject that is hidden behind the foreground and thus is supposed to be invisible when viewed from the viewpoint corresponding to $u=u_0$, and thus are excluded from the projected data points. The data points to be projected, i.e., the data points corresponding to the foreground may be searched as follows. Specifically, a point with the closest intensity value from each point on the straight line or the plane as the projection target is sequentially searched in both positive and negative u axis directions on the corresponding LF line element. FIG. 9B illustrates a result of the search executed on the data in FIG. 4. In FIG. 9B, the black area represents data points excluded from the projected data points. More specifically, the LF data in black regions is data hidden behind the foreground and thus is deemed to be physically incapable of reaching the camera. With the processing, the projection direction vector needs not to be obtained for all the data points, whereby the processing amount of the resolution enhancement can be reduced in some cases.

Figure 10:
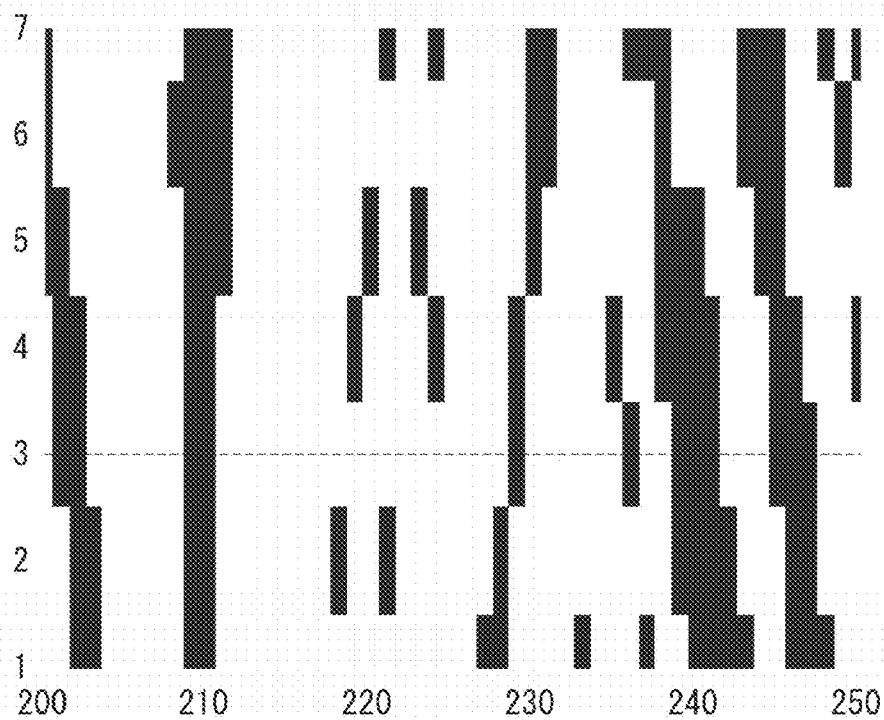
FIG. 10 is a diagram illustrating an example of outlier removing processing in the resolution enhancement.

Processing of excluding data points corresponding to a calculated projection direction vector with low reliability from the data points to be projected may be executed. An example of such processing includes processing of excluding points corresponding to the projection direction vector with the length shorter than a threshold. Furthermore, the reliability of the projection direction vector may be obtained through another processing. FIG. 10 is a diagram in which data points corresponding to the projection direction vector with the length shorter than half the median of the lengths of all the projection direction vectors are illustrated in black regions. In this case, the projection processing may not be executed on the data points that correspond to the black regions and thus have low reliability of the projection direction.

The projection target does not necessarily need to be the straight line or the plane. The data points may be projected on any subspace with a dimension that is the same or lower than that of the LF space. For example, when the LF data at a five or more dimensions including the dimension of the wavelength is projected on a three dimensional subspace, not only the spacial resolution of the output image but also the wavelength resolution performance of the spectral characteristics can be improved. The method of determining the projection direction vector in such a case is basically the same as the method described above.

In the present exemplary embodiment, the acquisition unit 201 functions as an acquisition unit that acquires the LF data. The LF data includes discrete data indicating the incidence position, the incidence direction, and the intensity of the ray incident on the imaging apparatus from the object. The projection unit 204 functions as a correction unit of generating correction data in which the amount of information in the LF data is increased in at least in a part of the LF space, based on the corresponding relationship among pieces of data corresponding to the same object. The direction determination unit 202 functions as a derivation unit that derives the information indicating the direction in which the plurality of pieces of data corresponding to the same object is arranged in the LF space. The operation unit 110 functions as an operation unit through which an instruction is input from a user. The plane determination unit 203 functions as a determination unit that determines a region in which the amount of information in the LF is increased in the LF space based on the user instruction input through the operation unit. The conversion unit 205 functions as a generation unit that generates image data having higher resolution than that of image data represented by the LF data.

In the first exemplary embodiment, the example is described where the resolution enhancement for the LF data at the viewpoint including the actually acquired data point (i.e., the viewpoint with u of an integer value) is executed on the input LF data. Exemplary embodiments to which the present invention can be applied are not limited to the exemplary embodiment described above, and the present invention can be applied to a case where the LF data at the viewpoint where the actual data is not acquired is generated. In a second exemplary embodiment, processing of generating high-resolution image data at $u=4.5$ from the input LF data is described. The resolution enhancement executed in the present exemplary embodiment is different from the first exemplary embodiment only in the position of the straight line as the projection target, and thus will not be described. FIG. 11 illustrates an effect of the present exemplary embodiment. In FIG. 11, "×" and "Δ" respectively represent high resolution data at $u=4.0$ and high resolution data at $u=5.0$ obtained by executing the resolution enhancement described in the first exemplary embodiment on the 7×256 LF data after the downsampling. A solid line represents high resolution image data at $u=4.5$ obtained by executing the resolution enhancement described in the first exemplary embodiment on the 7×256 LF data after the downsampling, and "○" represents the true high-resolution data at $u=4.5$ before the downsampling. It can be seen that the data close to the original data at $u=4.5$, different from the viewpoints $u=4.0$ and 5.0, is estimated by the resolution enhancement according to the present exemplary embodiment. As described above, the resolution enhancement described above can be applied to a case where the LF data at the viewpoint where the actual data is not acquired.

In the first and the second exemplary embodiments, examples are described where a single piece of high resolution image data corresponding to a single viewpoint is generated by the projection processing of the data points. In a third exemplary embodiment, an example is described where image data with focusing condition, such as a focus position and a depth of field, virtually changed is generated while obtaining the effect of resolution enhancement.

Figure 12A:
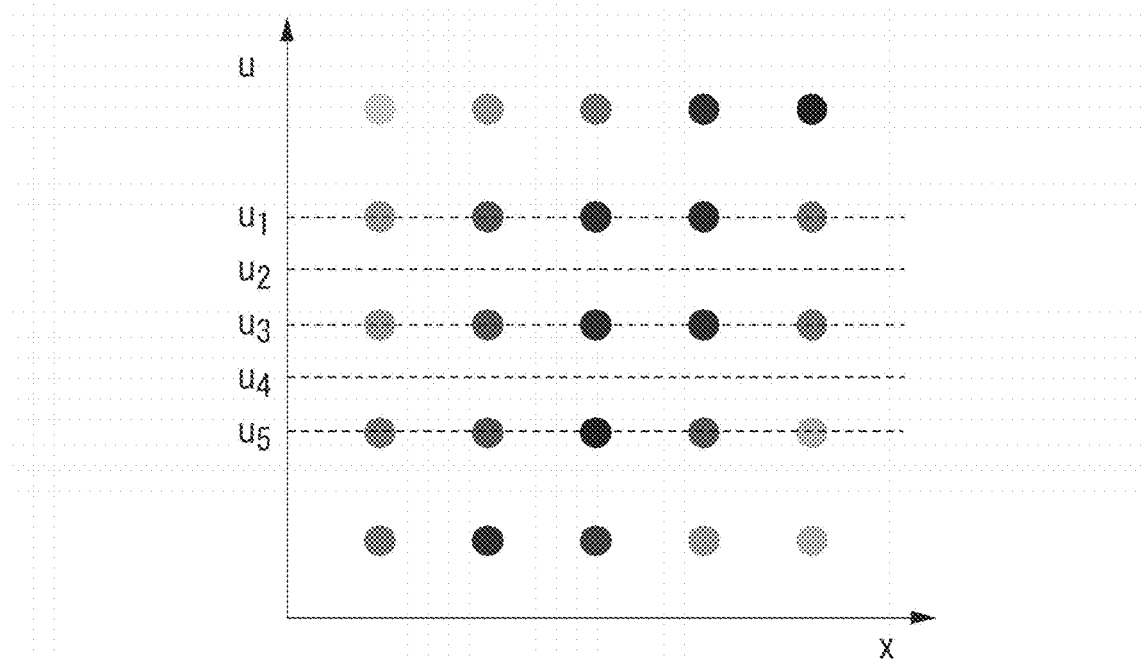
FIGS. 12A and 12B are diagrams illustrating a depth of field control for image data according to a third exemplary embodiment.
Figure 12B:
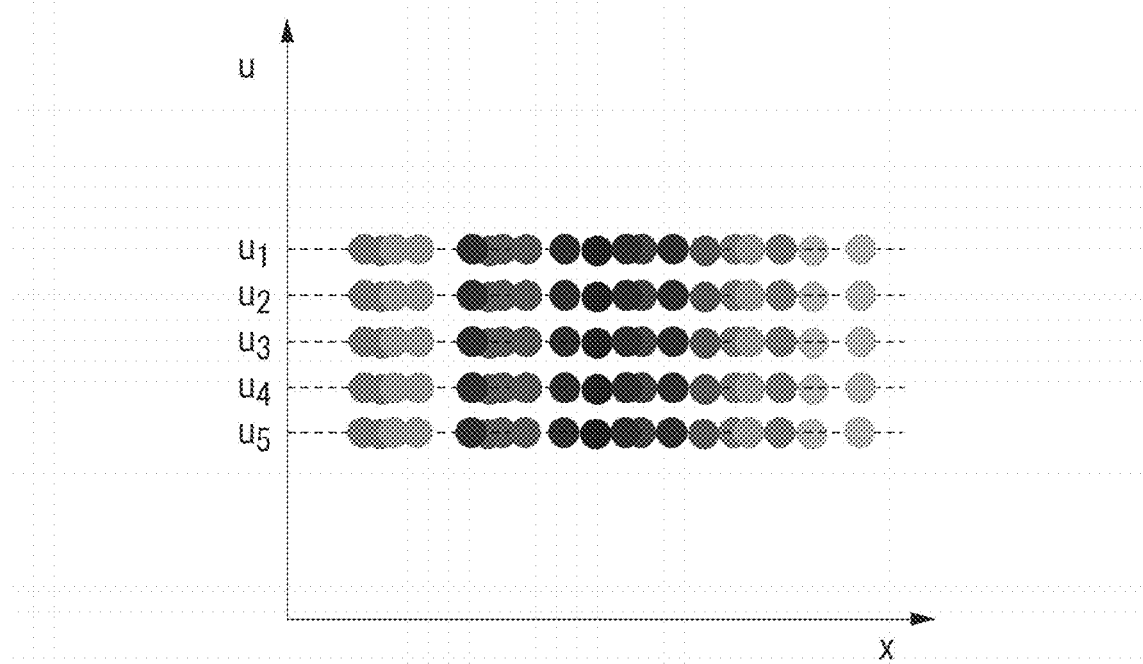

One known method of generating the image data with the focus position and the depth of field virtually changed from the LF data includes a method of integrating pieces of LF data on the LF space. The focus position and the depth of field of the generated image data can be changed by adjusting the direction and the interval of integration in the method. FIG. 12 illustrates an overview of the third exemplary embodiment. In the third exemplary embodiment, the plane determination unit 203 determines a plurality of projection targets in accordance with the depth of field desired by the user. In an example illustrated in FIG. 12A, straight lines $u=u_1$ to $u=u_5$ parallel to the x axis are set. When the projection is executed on the set projection targets as in the first exemplary embodiment and the second exemplary embodiment, five pieces of one dimensional data with high resolution are generated as illustrated in FIG. 12B. By integrating the five pieces of high resolution data in the u axis direction, the image data with the depth of field virtually changed can be generated while obtaining the effect of resolution enhancement. The processing can be regarded as processing of combining the pieces of image data corresponding to a plurality of viewpoints. Preferably, $u_1$ to $u_5$ are set at an equal interval to generate natural image data. By additionally providing the straight line as the projection target between adjacent ones of $u_1$ to $u_5$ with the interval between the $u_1$ to $u_5$ unchanged, the high resolution image data with more natural image quality can be obtained while maintaining the depth of field. The depth of field can be changed by changing the interval of $u_1$ to $u_5$. The number of straight lines as the projection targets is not limited to five, and more than five straight lines may be set.

Figure 13A:
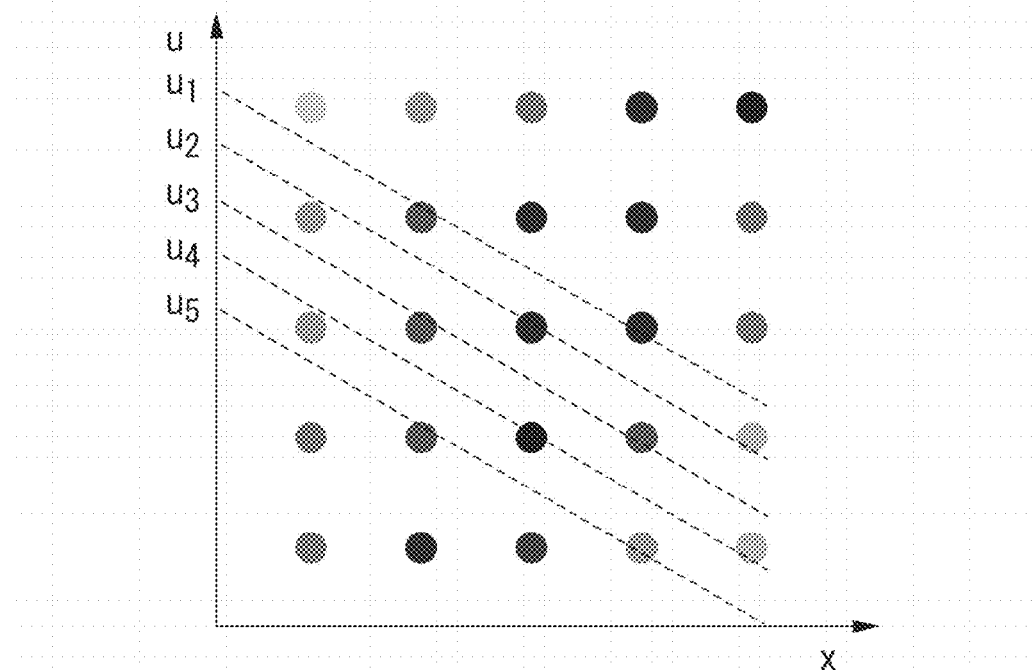
FIGS. 13A and 13B are diagrams illustrating a focus position control for the image data according to the third exemplary embodiment.
Figure 13B:
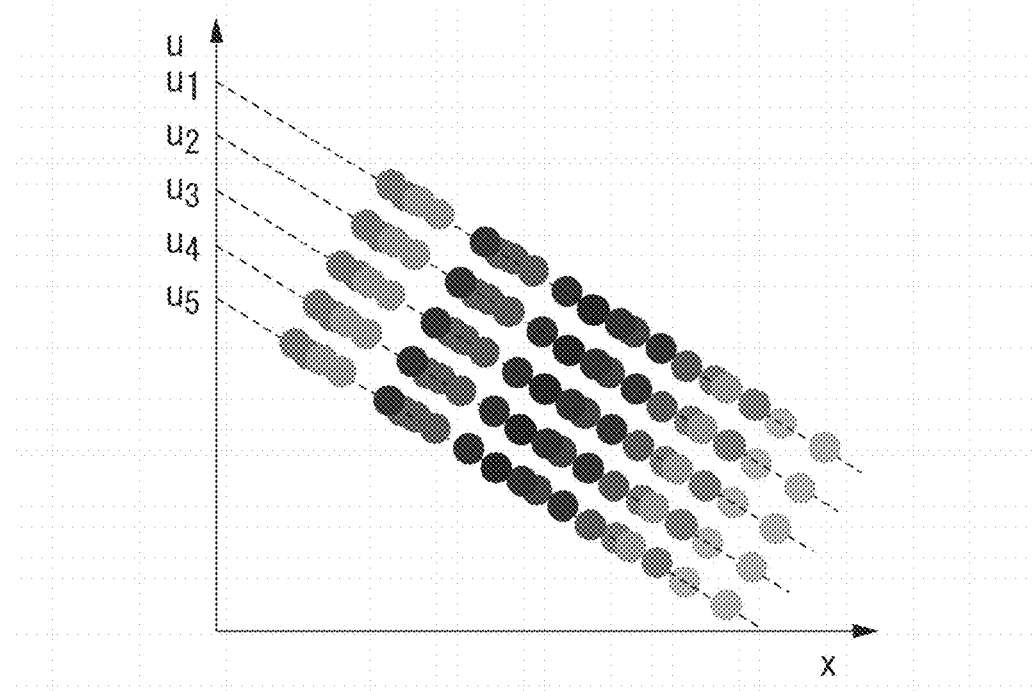

By changing the direction of integrating the plurality of pieces of high resolution data as illustrated in FIG. 12B, the focus position of the generated image data can be adjusted. When this processing is executed, the data position on the straight line as the projection target after the resampling preferably matches the direction of integration. Therefore, the straight line as the projection target may be inclined with respect to the x axis as illustrated in FIG. 13A. FIG. 13B illustrates a case where the data points are projected on the straight lines as the projection targets inclined as illustrated in FIG. 13A by using the methods described in the first and the second exemplary embodiments. When the plurality of pieces of high resolution data as illustrated in FIG. 13B is integrated in the direction orthogonal to the straight line as the projection target, excellent high resolution image data with the focus position changed can be obtained.

Processing executed in the processing apparatus 100 according to the third exemplary embodiment is described with reference to a flowchart in FIG. 14. The configuration of the information processing apparatus according to the third exemplary embodiment is similar to that in the first and the second exemplary embodiments, and thus will not be described. The processing that is similar to that in the first exemplary embodiment is denoted with the same step number as in FIG. 3 and will not be described. In step S1401, the plane determination unit 203 determines the position of the projection plane, on which the data points are projected, based on the operation performed on the operation unit 110 by the user. In the third exemplary embodiment, the user not only designates the viewpoint position but also designates the desired depth of field and the focus position. The plane determination unit 203 set a plurality of projection planes based on conditions set by the user, and outputs the projection planes to the projection unit 204. In step S1402, the projection unit 204 projects the data points based on the projection direction and the projection planes determined in steps S302 and S1401. This step is different from step S304 in the number of projection planes. The projection unit 204 derives all the intersection points between the LF line elements corresponding to the data points and the projection planes.

In step S1403, the projection unit 204 removes the data points corresponding to the background object hidden behind the foreground object from the LF data after the projection. In this processing, the processing as in step S305 is executed on all the projection planes, and the high resolution LF data on the projection planes are output to the conversion unit 205. In step S1404, resampling is executed on all pieces of the input high resolution LF data. In step S1405, the conversion unit 205 integrates the pieces of high resolution LF data and outputs the resultant high resolution image data.

The processing in the third exemplary embodiment is described above. With the processing described above, the image data with the depth of field and the focus position changed can be obtained while obtaining the effect of resolution enhancement. The processing in the third exemplary embodiment may be applied to LF data with higher dimensions as follows. Specifically, a plurality of non-continuous regions in the LF space is set as subspaces as the projection targets, and processing of combining pieces of LF data with the amount of increased in set regions is executed. Thus, the similar effect can be obtained.

Other Embodiments

In each of the exemplary embodiments described above, the correction data with the amount of information in the LF data on the projection straight line or the projection plane being increased is generated by projecting the data points in the LF data based on the inclination of the LF line element detected in the LF space. However, exemplary embodiments of the present invention are not limited to those described above. For example, the direction of the LF line element may not be directly obtained. Instead, the data points corresponding to the same object may be extracted through comparison between pixel values and the like, and the projection directions of the data points may be determined based on the combination between the extracted data points corresponding to the same object. A method of generating the correction data is not limited to the projection of the data points. Any method may be employed as long as the pixel values of the high-resolution image are determined based on the corresponding relationship between the data points corresponding to the same object.

The present invention may be implemented by the following processing. Specifically, a program implementing at least one function of the exemplary embodiments described above may be supplied to a system or an apparatus through a network or a storage medium, and at least one processor in the system or the apparatus may read and execute the program. The present invention can be implemented by a circuit (for example, application specific integrated circuit (ASIC)) implementing at least one function.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-098989, filed May 12, 2014, which is hereby incorporated by reference herein in its entirety.

What is claimed is:

1. An information processing apparatus comprising:
   at least one processor that operates to:
   acquire light field data including a plurality of pieces of data indicating an incidence position, an incidence direction, and an intensity of a ray incident on an imaging apparatus from an object;
   derive, for each piece of data included in the light field data, information indicating a projection method in a light field space defined by the incidence position and the incidence direction of the ray, based on a plurality of pieces of data corresponding to an object that is same as an object corresponding to the piece of data; and
   project data included in the light field data corresponding to a region that does not belong to a predetermined subspace in the light field space, on the predetermined subspace based on the derived projection method to generate corrected data in which an amount of information in the light field data is increased in the predetermined subspace.

2. The information processing apparatus according to claim 1, wherein the information indicating the projection method is information indicating a direction of the projection.

3. The information processing apparatus according to claim 1, wherein the information indicating the projection method is information indicating target coordinates of the projection.

4. The information processing apparatus according to claim 1, wherein the light field space is a coordinate space including a coordinate axis indicating the incidence position of the ray and a coordinate axis indicating the incidence direction of the ray.

5. The information processing apparatus according to claim 2,
   wherein the at least one processor further operates to derive, for each piece of data included in the light field data, information about a direction of a straight line formed of a group of pieces of data corresponding to the object that is the same as the object corresponding to the piece of data in the light field space, and
   wherein the at least one processor further operates to project the data included in the light field data corresponding to the region that does not belong to the predetermined subspace, in the direction of the straight line corresponding to the data included in the region that does not belong to the predetermined subspace to generate the correction data.

6. The information processing apparatus according to claim 1,
   wherein the at least one processor further operates to derive, for each piece of data included in the light field data, coordinates at which the predetermined subspace intersects with a straight line formed of a group of pieces of data corresponding to an object that is same as the object corresponding to the data in the light field space, as target coordinates of the projection, and
   wherein the at least one processor further operates to project the data included in the light field data corresponding to the region that does not belong to the predetermined subspace, on the derived coordinates, to generate the correction data.

7. The information processing apparatus according to claim 5, wherein the at least one processor further operates to project data that corresponds to or adjacent to the straight line passing through the predetermined subspace from among the pieces of data included in the region that does not belong to the predetermined subspace, on the predetermined subspace.

8. The information processing apparatus according to claim 5, wherein the at least one processor further operates to project data that corresponds to or adjacent to the straight line passing through the predetermined subspace from among the pieces of data included in the region that does not belong to the predetermined subspace, on the predetermined subspace.

9. The information processing apparatus according to claim 1, wherein when a region of a predetermined size included in the predetermined subspace includes a plurality of pieces of data in the correction data, the at least one processor further operates to set a weight of data corresponding to an object closest to the imaging apparatus, of the plurality of pieces of data in the region of the predetermined size, to be larger than a weight of other pieces of data in the region of the predetermined size.

10. The information processing apparatus according to claim 9, wherein the at least one processor further operates to set the weight of pieces of data, of the plurality of pieces of data in the region of the predetermined size, other than the data corresponding to the object closest to the imaging apparatus, to 0.

11. The information processing apparatus according to claim 9, wherein the at least one processor further operates to determine positional relationship between objects corresponding to the plurality of pieces of data existing in the region of the predetermined size, based on the direction of the straight line formed of the group of the pieces of the data corresponding to the objects in the light field space, and determine the weights based on the determined positional relationship.

12. The information processing apparatus according to claim 1, wherein the at least one processor further operates to:
    receive an instruction from a user; and
    determine a region in which the amount of information in the light field data is increased in the light field space based on the instruction received by the at least one processor.

13. The information processing apparatus according to claim 1, wherein the at least one processor further operates to generate image data having a higher resolution than a resolution of image data indicated by the light field data from the correction data.

14. The information processing apparatus according to claim 13,
    wherein the at least one processor further operates to generate the correction data in which the amount of information in the light field data is increased in a plurality of non-continuous regions included in the light field space, and wherein the at least one processor further operates to generate a plurality of pieces of image data corresponding to the plurality of respective non-continuous regions and combine the generated plurality of pieces of image data to generate image data having a higher resolution than a resolution of the image data indicated by the light field data and having a focus condition that is different from a focus condition of the image data indicated by the light field data.

15. An information processing method comprising:
acquiring light field data including a plurality of pieces of data indicating an incidence position, an incidence direction, and an intensity of a ray incident on an imaging apparatus from an object;
deriving, for each piece of data included in the light field data, information indicating a projection method in a light field space defined by the incidence position and the incidence direction of the ray, based on a plurality of pieces of data corresponding to an object that is same as an object corresponding to the piece of data; and
projecting data included in the light field data corresponding to a region that does not belong to a predetermined subspace in the light field space, on the predetermined subspace based on the derived projection method to generate correction data in which an amount of information in the light field data is increased in the predetermined subspace.

16. A non-transitory computer-readable storage medium storing a program for causing a computer to execute the method according to claim 15.

* * * * *